US008024149B2

(12) United States Patent
Rubin

(10) Patent No.: US 8,024,149 B2
(45) Date of Patent: Sep. 20, 2011

(54) OVERHEAT DETECTION SYSTEM

(75) Inventor: Lawrence M. Rubin, Glenmoore, PA (US)

(73) Assignee: Titanium Metals Corporation, Dallas, TX (US)

( * ) Notice: Subject to any disclaimer, the term of this patent is extended or adjusted under 35 U.S.C. 154(b) by 1273 days.

(21) Appl. No.: 11/626,669

(22) Filed: Jan. 24, 2007

(65) Prior Publication Data

US 2010/0145523 A1 Jun. 10, 2010

Related U.S. Application Data

(60) Provisional application No. 60/835,330, filed on Aug. 3, 2006.

(51) Int. Cl.
*G01K 1/08* (2006.01)
*G01K 17/00* (2006.01)

(52) U.S. Cl. ............ 702/130; 700/266; 700/274; 702/1; 702/24; 702/25; 702/127; 702/136; 702/138; 702/140

(58) Field of Classification Search .................. 700/266, 700/274; 702/1, 24, 25, 127, 130, 136, 138, 702/140
See application file for complete search history.

(56) References Cited

U.S. PATENT DOCUMENTS 3,105,275 A 10/1963 Hanks
3,760,393 A * 9/1973 Lindberg ...................... 340/508
3,896,423 A * 7/1975 Lindberg ...................... 340/508
4,091,658 A 5/1978 Covington et al.
4,823,358 A 4/1989 Aguirre et al.
5,267,587 A 12/1993 Brown
5,377,524 A 1/1995 Wise et al.
5,708,193 A 1/1998 Ledeen et al.
6,015,465 A * 1/2000 Kholodenko et al. ........ 118/719
6,064,686 A 5/2000 Zuniga et al.
6,313,476 B1 11/2001 Shimizu et al.
6,836,539 B2 12/2004 Katou et al.
2004/0011305 A1 1/2004 Herynek et al.

FOREIGN PATENT DOCUMENTS

CN 1136323 C 1/2004
EP 0 559 993 A1 9/1993
SU 1 271 890 A1 11/1986
WO WO 2005/017233 A2 2/2005

OTHER PUBLICATIONS

Supplemental European Search Report and European Search Opinion which were mailed Aug. 6, 2010, and received in corresponding European Patent Appl. No. 07756453.2.

* cited by examiner

*Primary Examiner* — Brian J Sines
(74) *Attorney, Agent, or Firm* — Locke Lord Bissell & Liddell LLP

(57) ABSTRACT

According to one embodiment of the invention, a method for preventing the failure of a system, which includes one or more pipes, or one or more cooling jackets, or one or more fluid cooled system components carrying a fluid, involves detecting one or more pressure levels of the fluid in the one or more pipes at one or more points, then comparing the detected pressure levels to a corresponding one or more predetermined limitation values. If the detected pressure levels exceed the corresponding limitation values, a shut-down signal is generated. The shut-down signal triggers the adjusting of one or more systems responsible for causing thermal variations of the fluid, preventing the system from failing while allowing the system to continue operation shortly thereafter.

28 Claims, 2 Drawing Sheets

Overheat Detection System

Overheat Detection System

OVERHEAT DETECTION SYSTEM

CROSS-REFERENCE TO RELATED APPLICATIONS

The present application claims priority to U.S. Provisional Application Ser. No. 60/835,330 filed Aug. 3, 2006, the entire contents of which is incorporated by reference herein.

TECHNICAL FIELD

This invention relates generally to the field of overheat detection and prevention systems and, more particularly, to techniques for preventing overheating conditions through the use of pressure measurements.

BACKGROUND

Liquids, such as water, are often used in an industrial process as the primary mechanism for heat transfer and regulation. In such processes, the liquid is often transported to and from the process center by way of a network of pipes. For example, in the field of metallurgical engineering, water is used to properly cool molten metal materials into desired forms.

When the temperature of a pipe or fluid cooled system component carrying a liquid such as water increases, the temperature of the liquid also increases. In the case of a copper pipe carrying water, because the melting point of copper is significantly higher than the boiling point of water, when the pipe or fluid cooled system component is exposed to too much heat the water will become steam, exerting a detectable pressure. If the temperature of the pipe becomes too great, the pipe or fluid cooled system component may melt or rupture, and allow the cooling liquid to leak in an undesired location, or prevent the liquid from reaching a necessary location. This generally necessitates the temporary cessation of the process until the damaged pipe or pipes or fluid cooled system components can be repaired. Such work stoppages are costly and inefficient and may cause product degradation.

There have been several attempts to address this issue. For example, U.S. Pat. No. 4,091,658 to Covington et al. discloses a system for measuring the pressure along fluid pipeline for the purposes of detecting leaks. It includes a pressure transducer for measuring pressure drops and logic to determine if there is a total drop in pressure or a pressure change which is beyond a preset limit. Covington et al. discloses shutting down a pipeline in instances of both inordinately low or high pressure conditions.

European patent No. 0559993 to Fanelli similarly discloses a system where pressure transducers are placed at various points along a pipe under pressure. Fanelli compares model values of the pressure flow to real values provided by the transducers, and produces an alarm signal when the comparison indicates a sudden loss of liquid due to a rupture of the pipeline.

U.S. Pat. No. 5,708,193 to Ledeen et al. proposes measuring pressure by creating a test pressure wave and detecting a reflecting wave of that test pressure wave using a pressure transducer. A digital filtering technique is used on the signal from the pressure transducer to permit detection of the location of a leak.

Likewise, U.S. Pat. No. 5,267,587 to Brown discloses an automatic monitoring system for utilities (i.e. water and gas). Brown proposes the use of pressure transducers to detect the pressure change of the utility, and solenoid valves to stop fluid (or gas) flow in the event that the pressure signal indicates unexpected leakage.

Unfortunately, the solutions disclosed by the prior art address situations where the system of pipes, or fluid cooled system components carrying the fluid has already failed. Accordingly, there exists a need for a technique for preventing a system of pipes or system components carrying a fluid from failing due to an overheating condition, in order to avoid the need to shut down the system and effect costly repairs.

SUMMARY

An object of the disclosed subject matter is to provide a technique for preventing a fluid-carrying system from failing due an overheating condition.

A further object of the disclosed subject matter is to provide such a technique which simultaneously permits the system to continue in operation.

In order to meet these and other objects of the disclosed subject matter which will become apparent with reference to further disclosure set forth below, the disclosed subject matter provides methods and systems for preventing the failure of a system which includes one or more pipes.

One embodiment of the disclosed subject matter is a system for overheat detection. The system can detect overheating in one or more pipes carrying a fluid where the fluid exerts a temperature and/or flow dependent pressure against the one or more pipes. The system includes at least one pressure transducer located at at least one point in the system for obtaining the pressure level of the fluid at the at least one point, an electronic gate control board for control of at least one heat generation device. The heat generation device can be an electron beam gun or an arc melt furnace, for example. The system also includes a computer coupled to random-access memory where the random-access memory has stored thereon software which when executed causes the computer to load at least one predetermined limitation value corresponding to the at least one point in the system, compare the at least one predetermined limitation value to the pressure level of the fluid at the at least one point in the system obtained by the at least one pressure transducer, and generate a shut-down signal if the pressure level lies outside of the predetermined limitation value, the shut-down signal transmitted to the electronic gate control board which adjusts the power output of at least one electron beam gun.

The at least one pressure transducer can be a solid-state pressure transducer. Alternatively, the at least one pressure transducer can be a high-speed pressure transducer.

The system can also include at least one electron beam chamber such that the at least one electron beam gun fires into the at least one electron beam chamber. The system can also include the following parts: at least one shelf inside the at least one electron beam chamber, where the at least one shelf is configured to feed raw product into the chamber for refining, at least one hearth where the electron beam gun fires onto the raw product which drops from the at least one shelf to melt the product into the at least one hearth for refining, and at least one mold such that the product enters the at least one mold.

The system of can also include at least one cooling jacket around at least one of: the at least one electron beam gun, the at least one shelf, the at least one hearth and the at least one mold. The system can also include at least one pump, where the at least one pump is configured to pump fluid into the at least one pipe such that the at least one cooling jacket cools the at least one electron beam gun by conduction.

The system can also include a heat exchanging system which includes at least one pipe, the at least one pipe carrying a heat exchange fluid and abutting the at least one pipe of the system to allow heat to transfer by conduction. The heat exchanging system can itself include a cooling tower system and a double wall heat exchanger adjacent to the overheat detection system. The software when executed can also cause the computer to calculate a rate of change of the at least one pressure level obtained from the at least one pressure transducer The electronic gate control board of the system can also adjust the power output of at least one electron beam gun by lowering the power output of the at least one electron beam gun. Alternatively, the electronic gate control board of the system can also adjust the power output of at least one electron beam gun by turning off the at least one electron beam gun. The system can also include a database which records data related to pressure deviation events.

The software when executed can also cause the computer to send an e-mail message to one or more persons responsible for supervising the system.

According to another embodiment, there is disclosed a method for overheat detection of a system including one or more pipes carrying a fluid, the fluid exerting a temperature and/or flow dependent pressure against the one or more pipes. The method includes obtaining through at least one pressure transducer at least one pressure level of the fluid in the system at at least one point, performing a comparison of the at least one pressure level obtained by the at least one pressure transducer to a corresponding predetermined limitation value, generating a shut-down signal if the pressure level lies outside of the predetermined limitation value, the shut-down signal transmitted to an electronic gate control board which adjusts a power output of at least one heat generation device, and allowing the system to continue operation.

The at least one pressure transducer can be a solid-state pressure transducer. Alternatively, the at least one pressure transducer can be a high-speed pressure transducer. The at least one heat generation device can be an electron beam gun, for example.

The method can also include firing the at least one electron beam gun fires into at least one electron beam chamber. The method can also include the following: configuring at least one shelf to feed raw product into the chamber for refining, firing the electron beam gun onto the raw product dropping from the at least one shelf to melt the product into at least one hearth for refining, and completing a refinement process when the product enters the at least one mold.

The method can also include providing at least one cooling jacket around at least one of: the at least one electron beam gun, the at least one shelf, the at least one hearth and the at least one mold. The method can also include providing at least one pump, where the at least one pump is configured to pump fluid into the at least one pipe such that the at least one cooling jacket cools the at least one electron beam gun by conduction.

The method can also include providing a heat exchanging system including at least one pipe where the at least one pipe carries a heat exchange fluid and abuts the at least one pipe of the system to allow heat to transfer by conduction. In the method, the heat exchanging system can include: a cooling tower system, and a double wall heat exchanger adjacent to the system. The method can also include calculating a rate of change of the at least one pressure level obtained from the at least one pressure transducer.

Adjusting the power output of at least one electron beam gun can includes lowering the power output of the at least one electron beam gun. Alternatively, adjusting the power output of at least one electron beam gun can include turning off the at least one electron beam gun. The method can also include recording in a database, data related to pressure deviation events.

The method can also include sending an e-mail message to one or more persons responsible for supervising the system.

Certain embodiments of the invention may provide numerous technical advantages. For example, a technical advantage of one embodiment may include preventing the system from failing while allowing the system to continue operation shortly thereafter. An additional technical advantage of this embodiment and/or of an alternate embodiment , may include lowering the risk that cooling fluid is inadvertently introduced into a melting chamber, for example, due to a sub-system compromise, thereby preventing the contamination of a product being refined in the melting chamber. Yet an additional technical advantage of this embodiment and/or of an alternate embodiment may include increasing cooling efficiency due to stricter regulation of the thermal condition of the pipes, or cooling jackets.

The accompanying drawings, which are incorporated and constitute part of this disclosure, illustrate preferred embodiments of the invention and serve to explain the principles of the invention.

BRIEF DESCRIPTION OF THE DRAWINGS

For a more complete understanding of example embodiments of the present invention and its advantages, reference is now made to the following description, taken in conjunction with the accompanying drawings, in which.

Figure 1:
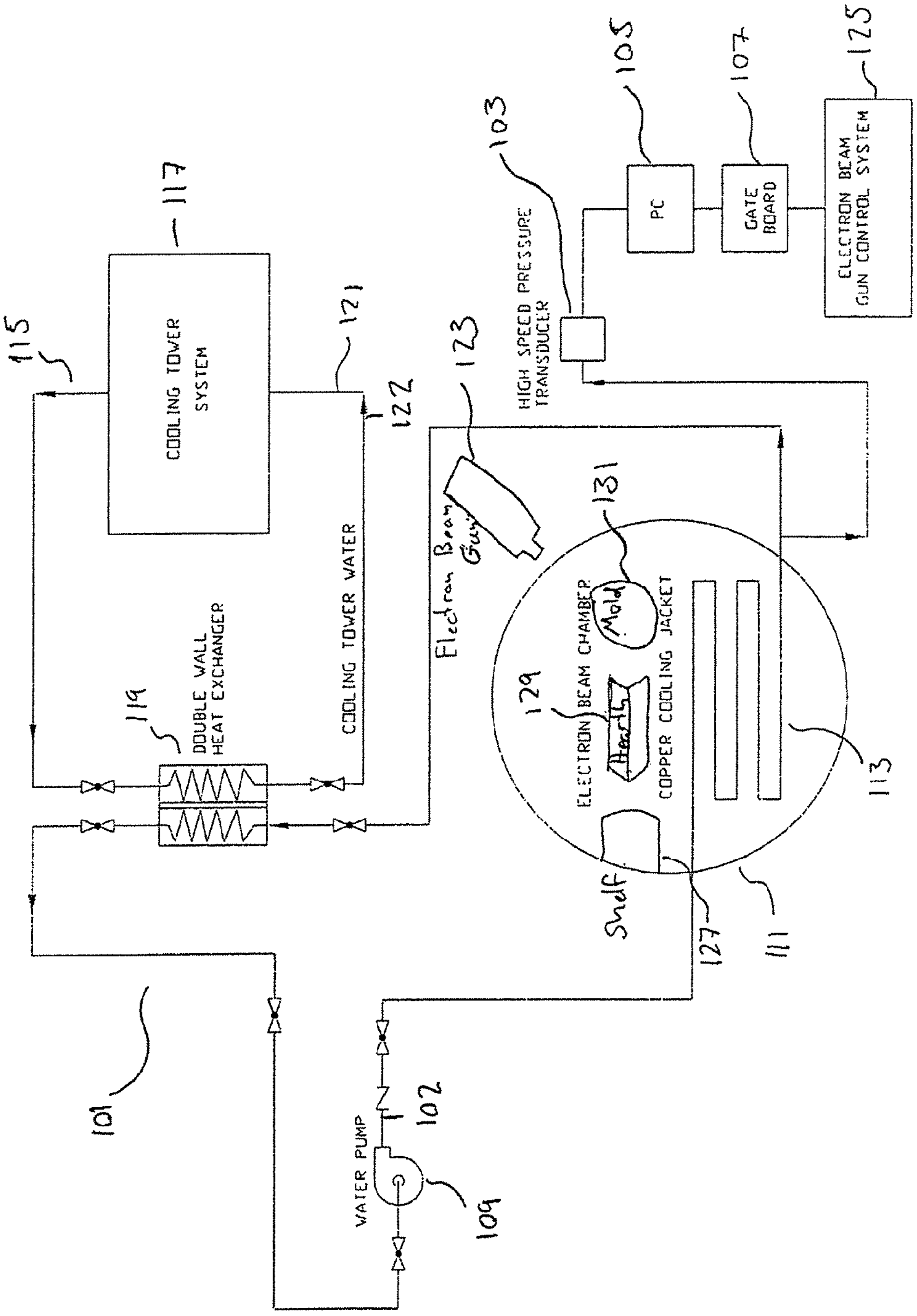
FIG. 1 is a schematic diagram of an exemplary embodiment of an overheat detection system.

Throughout the drawings, the same reference numerals and characters, unless otherwise stated, are used to denote like features, elements, components or portions of the illustrated embodiments. Moreover, while the present invention will now be described in detail with reference to the FIGS., it is done so in connection with the illustrative embodiments.

DETAILED DESCRIPTION

FIG. 1 is a schematic diagram of an exemplary embodiment of an overheat detection system 100 in accordance with the disclosed subject matter. The system includes one or more networks of one or more pipes 101 for carrying a fluid 102 such as water. In one example, there are eight such pipe networks 101, though in a preferred embodiment there may be anywhere from five to ten pipe networks 101. The pipes can be formed of copper or any other material suitable for transporting a fluid. Although the preferred embodiment is described with respect to water, the present invention is not limited to water carrying system and may be applied to other fluids.

Attached to the network of pipes 101 are one or more high-speed pressure transducers 103 capable of detecting one or more pressure levels of the fluid 102 at one or more points along the network of pipes 101. Preferably, each pipe in the network 101 is attached to a corresponding pressure transducer 103, which may be, e.g., a solid-state pressure transducer with a pressure range of 0-100 psi and a temperature limit of 160° F.

The pressure transducers 103 are connected to a computer 105 that is programmed with an overheat detection application 1. The computer 105 may be any computer suitable for running a computation-intensive software application, and may be, e.g., a personal computer. Conveniently, the overheat detection application 1 is software-implemented and stored in random-access memory of the computer 105. The software can be in the form of executable object code, obtained, e.g., by compiling from source code. Source code interpretation is not precluded. Source code can be in the form of sequence-controlled instructions as in Fortran, Pascal or "C", for example. Preferably, Visual Basic is used as the source code. The overheat detection application 1 performing the overheat detection method will be described more fully below in connection with FIG. 2.

The computer 105 is also connected to an electronic gate control board 107 that is capable of disabling one or more electron beam gun control systems 125. The electron beam gun control system 125 regulates the operation of the electron beam guns 123 that are capable of thermally varying the fluid 102 in the network of pipes 101. In one exemplary embodiment the electron beam guns 123 and electron beam gun control system 125 are manufactured by Von Ardenne and suitable for power levels 0-750,000 watts. The electron beam guns 123 are located on the top of an electron beam chamber 111 and fire into the chamber 111 at preset target locations, using programmable scan patterns that can be manually altered. The electron beam chamber 111 can include two electron beam chambers, one denoted the "North" chamber and other denoted the "South" chamber.

One or more shelves 127 can be located in the electron beam chamber and can be used to feed the raw product into the chamber 111 for refining. In this embodiment electron beam guns 123 fire onto the unrefined product, dropping from the shelf 127 to melt that product. The melted product then can flow onto one or more hearths 129, heated by electron beam guns, for refinement, ultimately entering one or more molds 131, heated by one or more electron beam guns, to complete the refinement process. In one exemplary embodiment the refining product is titanium.

Each pipe network 101 can form one or more cooling jackets 113 either around the one or more electron beam guns 123, around the one or more shelves 127, around the one or more hearths 129, around the one or more molds 131, or any combination of these components or any other components, as may be necessary. Each cooling jacket 113 can be formed with one channel or branch into multiple channels, either in series or in parallel. Additionally, each network 101 may have one or more jackets 113, either in parallel or in series. A suitable pump 109 pumps the fluid 102 to the pipe network 101, resulting in the cooling jacket 113 cooling the electron beam guns 123 by conduction. In a preferred embodiment, the pump 109 is a 100 HP pump, rated at 1200 gallons per minute.

The overheat detection system 100 can also include a heat exchanging system 115, formed from one or more pipes, and carrying a heat exchange fluid 122, which can be water. The heat exchange pipes 121 can pass through a double wall heat exchanger 119, such as plate type, double wall heat exchanger rated at 1,600,000 BTU/hr. Each network of pipes 101 can also pass through the double wall heat exchanger 119. Inside the double wall heat exchanger 119, the heat exchange pipes 121 should abut the pipes 101 to allow heat to transfer by conduction. The pipes 121 also pass through a cooling tower system 117 in order to cool the heat exchange fluid 122. The overheat detection method for an exemplary embodiment of the overheat detection system 100 will now be explained in more detail in connection with FIG. 2.

Figure 2:
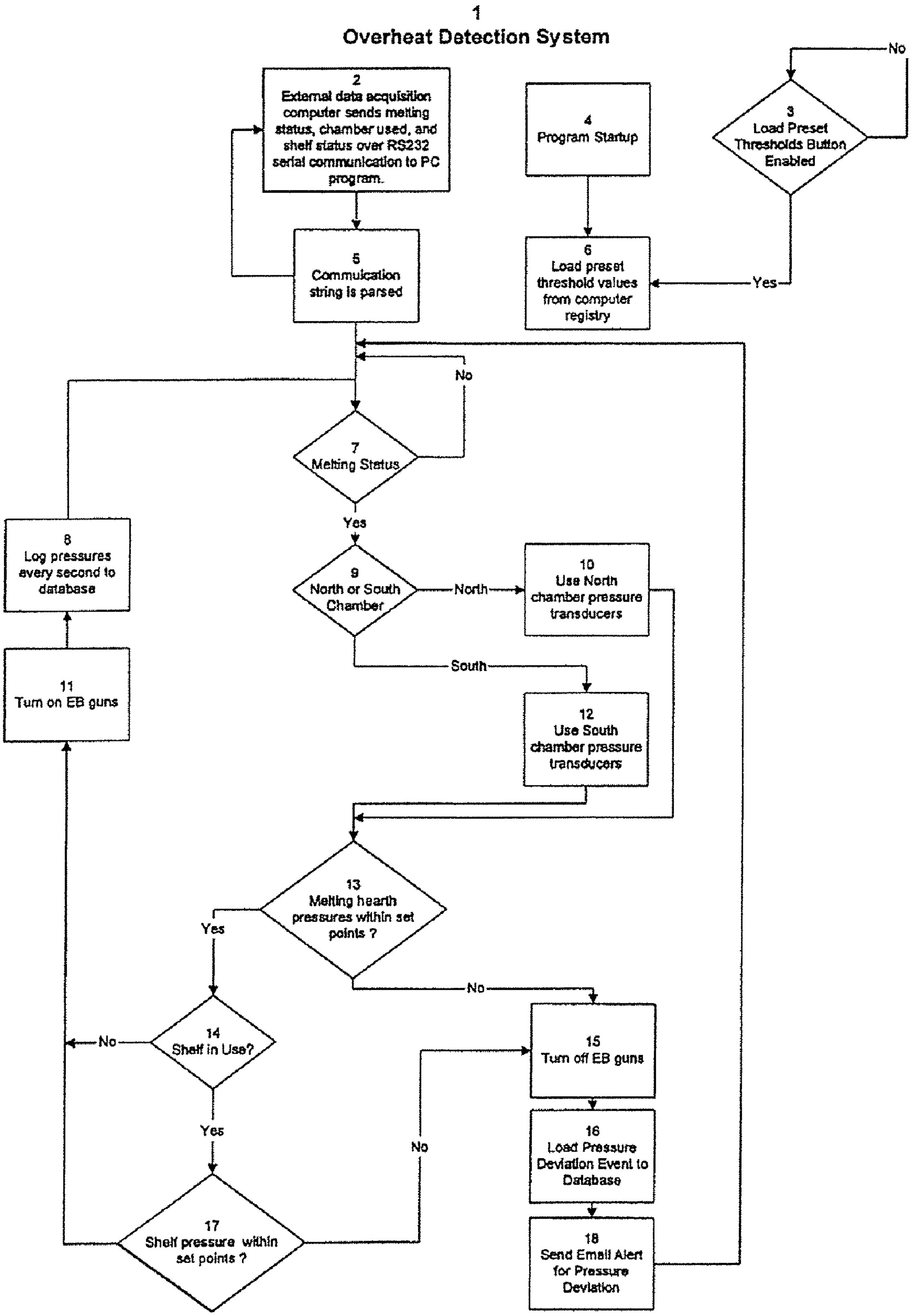
FIG. 2 is a flow chart of the steps of an exemplary embodiment of the overheat detection method performed by a software application programmed on a computer.

Referring next to FIG. 2, an exemplary embodiment of the overheat detection method performed by the overheat detection application 1 programmed on the computer 105 will be described. The overheat detection application 1 starts (4) and determines whether a load preset thresholds button is enabled (3). If so, the overheat detection application 1 loads from the registry of the computer 105 one or more predetermined limitation values (6). The predetermined limitation values correspond to maximum and minimum nominal operating pressures indicative of an unsafe pipe pressure, which in turn implies flow and/or temperature, for each of the pipes 101 with in each network, and may also include information concerning maximum acceptable rates of change of such pressure levels. In a highly preferred embodiment containing a fluid cooled shelf 127 and two fluid cooled hearths 129, the predetermined limitation values for the shelf 127 are a 1.4 psi minimum pressure, a 17.4 psi maximum pressure, and a 9 psi maximum rate of change. For the first hearth the values are a 0 psi minimum pressure, a 16 psi maximum pressure, and a 7.6 psi maximum rate of change. For the second hearth the values are a 0 psi minimum pressure, a 12.6 psi maximum pressure, and a 7.6 psi maximum rate of change.

An external data acquisition computer (not shown in figures) sends data (2) to the computer 105, indicating which of the electron beam chambers 111 (i.e., the North or South chamber) is in use, a status of melting in the electron beam chambers 111, and whether the shelf 127 is in use. The data can be in any convenient form, such as a string.

Next, the overheat detection application 1 parses the data received from the external data acquisition computer (5) through a RS232 serial communication line. Then, in (7), the overheat detection application 1 determines from the parsed string of data whether melting of a product is occurring in the electron beam chambers 111. If so, in (9), the overheat detection application 1 determines in which electron beam chamber 111 (i.e., North or South chamber) the melting of the product is occurring.

If the overheat detection application 1 determines that the electron beam chamber 111 in use is the North chamber, then in (10), the overheat detection application 1 obtains the pressure levels of the fluid 102 detected by the pressure transducers 103 associated with the North electron beam chamber 111. If the overheat detection application 1 determines that the electron beam chamber 111 in use is the South chamber, then in (12), the overheat detection application 1 obtains the pressure levels of the fluid 102 detected by the pressure transducers 103 associated with the South electron beam chamber 111.

Next, the overheat detection application 1 compares (13) the detected pressure levels 103 associated with the North electron beam chamber 111 or South electron beam chamber 111 in (10) or (12), respectively, with corresponding predetermined limitation values. Preferably, the overheat detection application 1 also calculates the rates of change of the detected pressure levels obtained from the pressure transducers 103, and compares the calculated rates of change of the detected pressure levels with corresponding predetermined limitation values.

If the overheat detection application 1 determines that any of the detected pressure levels obtained in either (10) or (12), or any of the rates of change calculated therefrom, exceeds or falls below a proper range (a pressure deviation event), then the overheat detection application 1 generates a shut-down signal (15) that is transmitted to the electronic gate control board 107. Subsequently, the electronic gate control board 107 adjusts the electron beam control system 125, turning off the corresponding electron beam gun or guns 123, thereby preventing the pipe network 101 from failing. In an alternate embodiment, the same goal is achieved by lowering the power output of the one or more electron beam guns 123.

The overheat detection application 1 can also record to a database (160, for future analysis, data related to pressure deviation events, including the time and date of the event, the pressure level measurements associated with the event, and the rates of change associated with the measurements. Such analysis is helpful in accurately determining the proper predetermined limitation values. Also, in the event that a shut-down signal can be generated and transmitted the overheat detection application 1 preferably transmits a message (18), such as an e-mail message, to one or more persons responsible for supervising the overheat detection system 100 reporting the pressure deviation event.

Alternatively, if the overheat detection application 1 determines that the one or more detected pressure levels, or the rates of change calculated therefrom, do not exceed or fall below the proper range as determined from the predetermined limitation values (13) then the overheat detection application 1 may also determines whether the shelf is in use (14) by analyzing the data parsed in (5). If the shelf is in use, the overheat detection application 1 can obtain the one or more pressure levels detected by the pressure transducers 103 associated with the shelf, and compare the detected pressure levels with the predetermined limitation values (17).

Further, in (17), the overheat detection application 1 can calculate the rates of change of the detected pressure levels obtained from the pressure transducers 103 associated with the shelf, and compare the calculated rates of change of the detected pressure levels with the predetermined limitation values. If the overheat detection application 1 determines that any of the one or more detected pressure levels, or any of the rates of change calculated therefrom, exceeds or falls below the proper range (a pressure deviation event) as determined from the predetermined limitation values, the overheat detection application 1 proceeds to (15), described above.

On the other hand, if the shelf is not in use, or if the pressure levels detected by the pressure transducers 103 associated with the shelf, or the rates of change calculated therefrom, do not exceed or fall below the proper range as determined from the predetermined limitation values, the overheat detection application 1 proceeds to (11). In (11), the overheat detection application 1 turns on the electron beam gun or guns 123, if they are not already on. Finally, the overheat detection application 1 records the detected pressure levels and corresponding rates of change of the detected pressure levels (8).

The foregoing merely illustrates the principles of the invention. Various modifications and alterations to the described embodiments will be apparent to those skilled in the art in view of the teachings herein. It will thus be appreciated that those skilled in the art will be able to devise numerous techniques which, although not explicitly described herein, embody the principles of the invention and are thus within the spirit and scope of the invention.

What is claimed is:

1. A system for overheat detection, comprising:

a chamber;

a heat generation device configured to generate heat within the chamber;

a pipe configured to carry a fluid through the chamber and to remove heat generated within the chamber, the fluid exerting a temperature and flow dependent pressure against the pipe;

a pressure transducer located at a point in the system for obtaining a pressure level of the fluid at the point;

an electronic gate control board for control of the heat generation device, the heat generation device including an electron beam gun having a power output; and a computer coupled to random-access memory, the random-access memory having stored thereon software which when executed causes the computer to:

load a predetermined limitation value corresponding to the point in the system, compare the predetermined limitation value to the pressure level of the fluid at the point in the system obtained by the pressure transducer, and generate a shut-down signal if the pressure level lies outside of the predetermined limitation value, and transmit the shut-down signal to the electronic gate control board which is configured to adjust the power output of the heat generation device before an overheat failure of the system occurs.

2. The system of claim 1 wherein the pressure transducer comprises a solid-state pressure transducer.

3. The system of claim 1 wherein the pressure transducer comprises a high-speed pressure transducer.

4. The system of claim 1, wherein the chamber is an electron beam chamber and the electron beam gun fires into the electron beam chamber.

5. The system of claim 4 further comprising:

a shelf inside the electron beam chamber, the shelf configured to feed raw product into the electron beam chamber for refining;

a hearth, the electron beam gun firing onto the raw product dropping from the shelf to melt the raw product into the hearth for refining;

a mold, the melted raw product entering the mold, thus completing the refinement process.

6. The system of claim 5 further comprising a cooling jacket around at least one of: the electron beam gun, the shelf, the hearth and the mold.

7. The system of claim 5 further comprising a pump, the pump configured to pump fluid into the pipe such that the cooling jacket cools the electron beam gun by conduction.

8. The system of claim 1 further comprising a heat exchanging system including a pipe, the pipe carrying a heat exchange fluid and abutting the pipe of the system to allow heat to transfer by conduction.

9. The system of claim 8 wherein the heat exchanging system includes:

a cooling tower system; and a double wall heat exchanger adjacent to the system.

10. The system of claim 1, wherein the software, when executed, also causes the computer to calculate a rate of change of the pressure level obtained from the pressure transducer.

11. The system of claim 1, wherein the electronic gate control board adjusts the power output of the electron beam gun by lowering the power output of the electron beam gun.

12. The system of claim 1, wherein the electronic gate control board adjusts the power output of the electron beam gun by turning off the electron beam gun.

13. The system of claim 1, further comprising a database, the database configured to record data related to pressure deviation events.

14. The system of claim 1, wherein the software, when executed, also causes the computer to send an e-mail message to a person responsible for supervising the system.

15. A method for overheat detection comprising:

carrying a fluid through a pipe contained within a chamber to remove heat generated within the chamber, the fluid exerting a temperature and flow dependent pressure against the pipe;

obtaining, through a pressure transducer located at a point in the system, a pressure level of the fluid at the point;

performing a comparison of the pressure level obtained by the pressure transducer to a corresponding predetermined limitation value; and generating a shut-down signal if the pressure level lies outside of the predetermined limitation value, and transmitting the shut-down signal to an electronic gate control board which is configured to adjust a power output of the heat generation device, the heat generation device comprising an electron beam gun.

16. The method of claim 15, wherein the pressure transducer comprises a solid-state pressure transducer.

17. The method of claim 15, wherein the pressure transducer comprises a high-speed pressure transducer.

18. The method of claim 15, further comprising firing the electron beam gun into the chamber, the chamber comprising an electron beam chamber.

19. The method of claim 15, further comprising:

configuring a shelf to feed raw product into the chamber for refining;

firing the electron beam gun onto the raw product dropping from the shelf to melt the raw product into a hearth for refining;

completing a refinement process when the melted raw product enters a mold.

20. The method of claim 19 further comprising providing a cooling jacket around at least one of: the electron beam gun, the shelf, the hearth and the mold.

21. The method of claim 19 further comprising providing a pump, the pump configured to pump fluid into the pipe such that the cooling jacket cools the electron beam gun by conduction.

22. The method of claim 15 further comprising providing a heat exchanging system including a pipe, the pipe carrying a heat exchange fluid and abutting the pipe of the system to allow heat to transfer by conduction.

23. The method of claim 22 wherein the heat exchanging system includes:

a cooling tower system; and a double wall heat exchanger adjacent to the system.

24. The method of claim 15, further comprising calculating a rate of change of the pressure level obtained from the pressure transducer.

25. The method of claim 15, wherein adjusting the power output of the electron beam gun includes lowering the power output of the electron beam gun.

26. The method of claim 15, wherein adjusting the power output of the electron beam gun includes turning off the electron beam gun.

27. The method of claim 15, further comprising recording in a database, data related to pressure deviation events.

28. The method of claim 15, further comprising sending an e-mail message to a person responsible for supervising the system.

* * * * *